(No Model.)

H. J. GILBERT.
SEPARABLE PULLEY.

No. 405,352. Patented June 18, 1889.

Witnesses.
Adelaide A. Anderson
Geo. H. Lothrop

Inventor
Henry J. Gilbert

UNITED STATES PATENT OFFICE.

HENRY J. GILBERT, OF SAGINAW, MICHIGAN.

SEPARABLE PULLEY.

SPECIFICATION forming part of Letters Patent No. 405,352, dated June 18, 1889.

Application filed March 7, 1889. Serial No. 302,300. (No model.)

*To all whom it may concern:*

Be it known that I, HENRY J. GILBERT, of Saginaw, in the county of Saginaw and State of Michigan, have invented a new and useful Improvement in Separable Pulleys, of which the following is a specification.

My invention consists in an improvement in separable pulleys hereinafter fully described and claimed.

Figure 1:
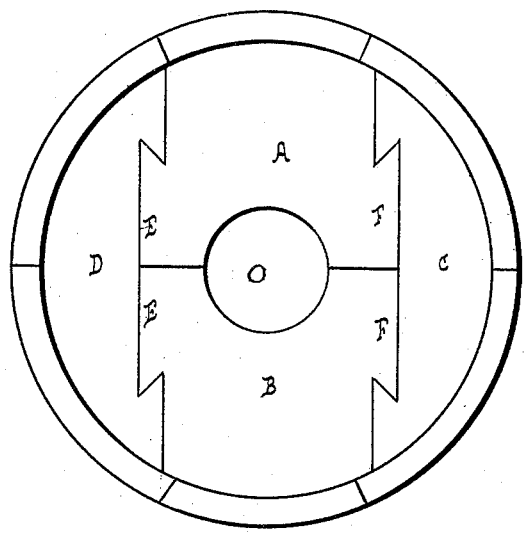
Figure 2:
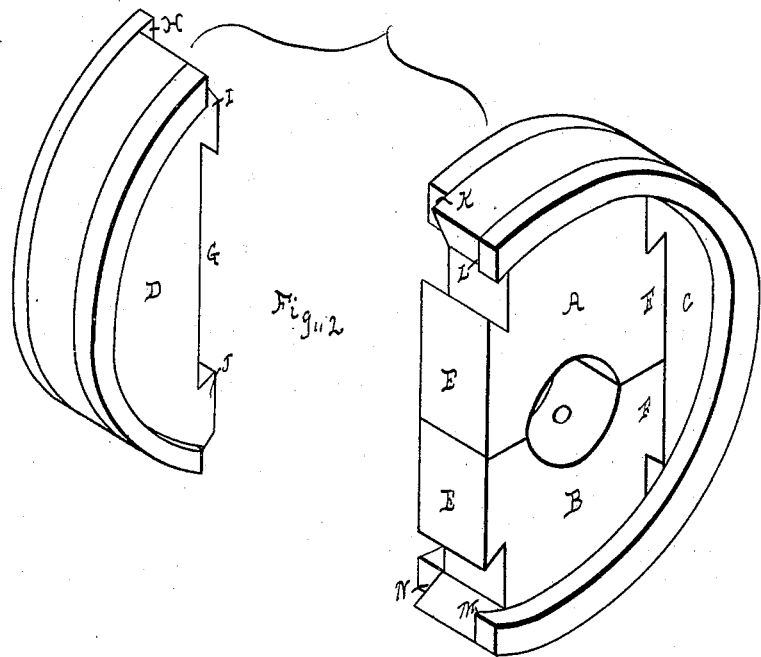

Figure 1 is an elevation of the complete pulley, and Fig. 2 a perspective of the pulley with one of the parts removed.

The pulley is formed in four parts A, B, C, and D, the parts A and B being diametrically divided from each other and being divided from the pieces C and D by the irregular lines E and F, forming interlocking joints whereby the parts C and D lock the parts A and B together and at the same time are themselves locked to said parts A and B.

The rim of the pulley is divided on different lines from the lines F and E, as shown in Fig. 2, the end L on part A and M on part B projecting beyond the line E, while the end K on part A and N on part B stop short of the line E, and the corresponding portions of the rim on part D are oppositely cut, as shown at the points I and H, Fig. 2.

The rim of the pulley is composed of the peripheral portions of the four segmental sections A, B, C, and D, and of narrow curved pieces which are cut in the circular form represented in Fig. 1, and glued, nailed, or otherwise attached to the opposite sides of the segmental sections.

O represents the shaft-opening, and the pulley is locked on the shaft by any desired form of bushing.

What I claim as my invention, and desire to secure by Letters Patent, is—

A separable pulley composed of the parts A, B, C, and D, the parts A and B divided from each other diametrically by a straight line and divided from the parts C and D on the irregular lines E and F, whereby interlocking joints are formed between the parts A B and the parts C D, substantially as shown and described.

HENRY J. GILBERT.

Witnesses:
ADELAIDE A. ANDERSON,
GEO. H. LOTHROP.